US009477999B2

United States Patent
Hameed et al.

(10) Patent No.: US 9,477,999 B2
(45) Date of Patent: Oct. 25, 2016

(54) LOW POWER PROGRAMMABLE IMAGE PROCESSOR

(71) Applicant: The Board of Trustees of the Leland Stanford Junior University, Palo Alto, CA (US)

(72) Inventors: Rehan Hameed, Palo Alto, CA (US); Wajahat Qadeer, Menlo Park, CA (US); Christoforos Kozyrakis, Stanford, CA (US); Mark A. Horowitz, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 33 days.

(21) Appl. No.: 14/492,535

(22) Filed: Sep. 22, 2014

(65) Prior Publication Data
US 2015/0086134 A1    Mar. 26, 2015

Related U.S. Application Data

(60) Provisional application No. 61/880,637, filed on Sep. 20, 2013.

(51) Int. Cl.
*G06K 9/64* (2006.01)
*G06T 1/20* (2006.01)

(52) U.S. Cl.
CPC .................................... *G06T 1/20* (2013.01)

(58) Field of Classification Search
None
See application file for complete search history.

(56) References Cited

U.S. PATENT DOCUMENTS

| | | | |
|---|---|---|---|
| 4,720,871 A | 1/1988 | Chambers | |
| 5,748,178 A * | 5/1998 | Drewry | G09G 5/395 345/547 |
| 5,949,920 A * | 9/1999 | Jordan | G06F 17/153 382/205 |
| 6,116,768 A | 9/2000 | Guttag et al. | |
| 6,226,418 B1 | 5/2001 | Miller et al. | |
| 6,282,627 B1 | 8/2001 | Wong et al. | |
| 6,493,467 B1 * | 12/2002 | Okuda | G06T 1/20 382/260 |
| 2012/0166762 A1 | 6/2012 | Park et al. | |
| 2014/0375847 A1 * | 12/2014 | Kasahara | H04N 5/357 348/241 |

OTHER PUBLICATIONS

Cong, Jason et al., "Customizable Domain-Specific Computing," IEEE Design & Test of Computers, vol. 28, Issue 2, Mar./Apr. 2011, IEEE, pp. 6-15.
Shacham, Ofer et al., "Avoiding Game Over: Bringing Design to the Next Level," 49th ACM/EDAC/IEEE Design Automation Conference (DAC), Jun. 3-7, 2012, San Francisco, CA, IEEE, pp. 623-629.
Camunas-Mesa, L. et al., "A 32×32 Pixel Convolution Processor Chip for Address Event Vision Sensors With 155 ns Event Latency and 20 Meps Throughput," IEEE Transactions on Circuits and Systems—I: Regular Papers, vol. 58, No. 4, Apr. 2011, IEEE, pp. 777-790.
Di Carlo, S. et al., "An area-efficient 2-D convolution implementation on FPGA for space applications," IEEE 6th International Design and Test Workshop (IDT), Dec. 11-14, 2011, Beirut, LI, IEEE, pp. 88-92.

* cited by examiner

*Primary Examiner* — Li Liu
(74) *Attorney, Agent, or Firm* — Withrow & Terranova, P.L.L.C.

(57) ABSTRACT

A convolution image processor includes a load and store unit, a shift register unit, and a mapping unit. The load and store unit is configured to load and store image pixel data and allow for unaligned access of the image pixel data. The shift register is configured to load and store at least a portion of the image pixel data from the load and store unit and concurrently provide access to each image pixel value in the portion of the image pixel data. The mapping unit is configured to generate a number of shifted versions of image pixel data and corresponding stencil data from the portion of the image pixel data, and concurrently perform one or more operations on each image pixel value in the shifted versions of the portion of the image pixel data and a corresponding stencil value in the corresponding stencil data.

25 Claims, 8 Drawing Sheets

```
// Set MAP function = MULT, Reduce function = ADD
SET_CE_OPS (CE_MULT, CE_ADD);

// Set convolution size 16, mask out 16th element
SET_CE_OPSIZE(16, 0x7fff);

// Load 16 8-bit coefficients into Coeff Reg Row 0
LD_COEFF_REG_128(coeffPtr, 0);

// Load & shift 16 input pixels into 1D shift register
LD_1D_REG_128(inPtr, SHIFT_ENABLED);

// Filtering loop
for (x = 0; x < width - 16; x += 16) {
   // Load & Shift 16 more pixels
   LD_1D_REG_128(inPtr, SHIFT_ENABLED);

// Filter first 8 locations
   CONVOLVE_1D_HOR(IN_OFFSET_0, OUT_OFFSET_0);

// Filter next 8 locations
   CONVOLVE_1D_HOR(IN_OFFSET_8, OUT_OFFSET_8);

// Add 2 to row 0 of output register
   SIMD_ADD_CONST (0, 2);

// Store 16 output pixels
   ST_OUT_REG_128(outPtr);

inPtr += 16;
   outPtr += 16;
}
```

FIG. 5

LOW POWER PROGRAMMABLE IMAGE PROCESSOR

RELATED APPLICATIONS

This application claims the benefit of provisional patent application Ser. No. 61/880,637, filed Sep. 20, 2013, the disclosure of which is hereby incorporated herein by reference in its entirety.

GOVERNMENT SUPPORT

This invention was made with government funds under contract number HR0011-07-3-0002 and contract number HR0011-11-C-0007 awarded by DARPA. The U.S. Government has certain rights in this invention.

FIELD OF THE DISCLOSURE

The present disclosure relates to programmable processors. Specifically, the present disclosure relates to programmable processors with low energy consumption that are configured to perform one or more convolution image processing algorithms.

BACKGROUND

In recent times, there has been a dramatic shift in consumer photography. Once dominated by dedicated cameras and photography equipment, a majority of pictures today are taken via camera-equipped mobile devices such as smartphones. Although smartphones offer a great deal of convenience and portability, the quality of the resulting photographs is often quite poor. The discrepancy in image quality between smartphones and dedicated cameras stems from the small form factor of smartphones, which limits the available optics and image sensors. One way to enhance the quality of images produced by a smartphone is via computational image processing techniques such as high dynamic range (HDR) imaging, multi-frame noise reduction, synthetic aperture, flash-no-flash photography, super resolution, and video de-shake. While the above-mentioned computational image processing techniques offer vast improvements in the quality of images produced by smartphones, implementing these techniques in hardware is often expensive in terms of power consumption, area consumption, and/or cost.

Generally, current smartphones apply one of two paradigms in their implementation of image signal processing hardware. A first paradigm uses a general-purpose processor (e.g., the main processor of the smartphone) to implement one or more of the computational image processing techniques discussed above. Although these general-purpose processors are capable of performing a wide range of computational image processing techniques, they are highly inefficient at doing so. Specifically, the overhead associated with predicting, fetching, decoding, scheduling, and committing instructions in a general-purpose processor adds significant computation time to the image processing techniques, especially when considering the particular data storage structures, data flow, and data locality of computational image processing techniques in general.

A second paradigm uses separate application specific image signal processing hardware (i.e., accelerators) for each one of the computational image processing techniques implemented by the smartphone. Although each one of the application specific image processors may provide an improvement in computational efficiency over a general-purpose processor as large as three orders of magnitude, separate hardware for each one of the computational image processing techniques consumes a large amount of area in the smartphone, and further adds significant expense to the device. Further, as new computational image signal processing techniques are developed, dedicated hardware for implementing the new technique must similarly be developed, which prevents implementation of the new technique in currently deployed devices.

Accordingly, there is a need for compact image signal processing hardware that is capable of efficiently performing a variety of computational image processing techniques.

SUMMARY

The present disclosure relates to programmable processors with low energy consumption that are configured to perform one or more convolution image processing algorithms. In one embodiment, a convolution image processor includes a load and store unit, a shift register unit, and a mapping unit.

The load and store unit is configured to load and store image pixel data and stencil data such that the load and store unit allows for unaligned access of the image pixel data. The shift register unit is configured to load and store at least a portion of the image pixel data from the load and store unit and concurrently provide access to each image pixel value in the portion of the image pixel data.

The mapping unit is configured to generate a number of shifted versions of image pixel data and corresponding stencil data from the portion of the image pixel data, and concurrently perform one or more operations on each image pixel value in the shifted versions of the portion of the image pixel data and a corresponding stencil value in the corresponding stencil data. By using a load and store unit that allows unaligned access of the image pixel data, a shift register unit that concurrently provides access to each image pixel value in a portion of the image pixel data, and a mapping unit that generates a number of shifted versions of the portion of the image pixel data and corresponding stencil data, the number of cycles used to calculate a convolution image processing algorithm is significantly reduced, thereby saving both time and energy. Further, the load and store unit may be kept quite small while still being capable of providing data for a large number of mapping operations per cycle, thereby further decreasing the energy consumption of the convolution image processor by reducing the amount of energy consumed by local data storage. Finally, the convolution image processor is capable of performing a number of different operations, thereby increasing the flexibility of the convolution image processor by allowing the processor to calculate a number of convolution-based image processing algorithms.

In one embodiment, the shift register unit includes a number of two dimensional shift registers. Because image pixel data is inherently two-dimensional (including both rows and columns of image pixel values), better energy efficiency and performance is achieved by the convolution image processor by enabling storage and access of the image pixel data as such. Further, the two dimensional shift registers facilitate efficient access to the image pixel data, thereby enabling computation of a large number of convolution operations in parallel and further enhancing efficiency and performance.

In one embodiment, the mapping unit is fully programmable, such that the pattern of the shifted versions of image pixel data and the one or more operations performed on each image pixel value in the shifted versions of the portion of image pixel data are selectable. Accordingly, a variety of different convolution image processing algorithms may be efficiently implemented by the convolution image processor.

In one embodiment, the convolution image processor further includes a reducing unit configured to combine at least two of the resulting values from the operations on each image pixel value and the corresponding stencil value in the corresponding stencil data.

In one embodiment, a method of operating a convolution image processor includes loading and storing image pixel data and stencil data and providing unaligned access of the image pixel data via a load and store unit, loading and storing at least a portion of the image pixel data and providing concurrent access to each image pixel value in the portion of the image pixel data via a shift register unit, and generating a number of shifted versions of image pixel data and corresponding stencil data from the portion of the image pixel data, as well as concurrently performing one or more operations on each image pixel value in the number of shifted versions of the portion of the image pixel data and a corresponding stencil value in the corresponding stencil data via a mapping unit.

In one embodiment, the method further includes combining at least two of the resulting values from the operations on each image pixel value and the corresponding stencil value in the corresponding stencil data.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5 shows pseudocode for controlling the convolution image processor according to one embodiment of the present disclosure.

DETAILED DESCRIPTION

Figure 1:
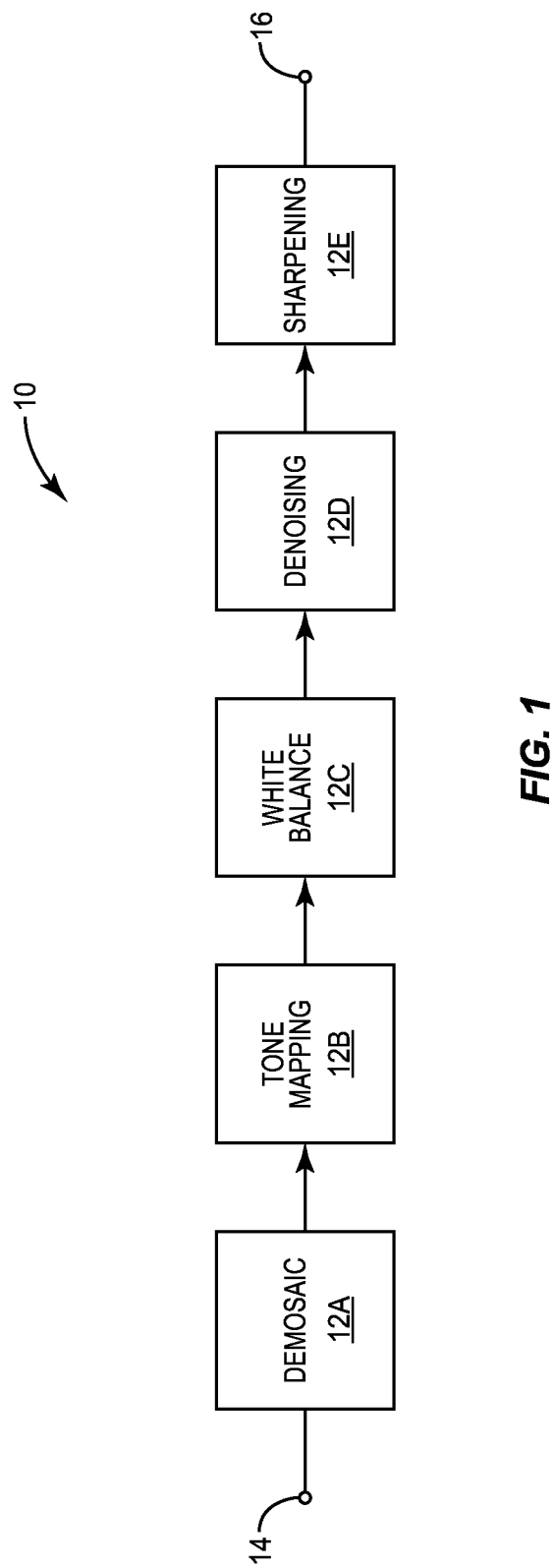
FIG. 1 is a block diagram representing a computational image processing pipeline according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Turning now to FIG. 1, an exemplary computational image processing pipeline 10 is shown according to one embodiment of the present disclosure. The computational image processing pipeline 10 may include multiple image processing modules 12 arranged in a serial fashion between an input node 14 and an output node 16. Specifically, the image processing pipeline 10 may include a demosaic module 12A, a tone mapping module 12B, a white balance module 12C, a denoising module 12D, and a sharpening module 12E. In operation, when image pixel data is delivered to the input node 14, it passes through each one of the image processing modules 12. Each one of the image processing modules 12 performs a different computational image processing technique on the image pixel data, such that the resulting image pixel data has been processed multiple times in different ways. The resulting image pixel data delivered to the output node may offer improvements in image quality that compensate for one or more detractors present in the original image pixel data due to inherent limitations in the camera that captured the image pixel data.

Although specific image processing modules 12 are shown in the image processing pipeline 10, any number of different image processing modules 12 performing a variety of computational image processing techniques may be used without departing from the principles of the present disclosure. In general, the image processing pipeline 10 is configured to perform one or more computational image processing techniques in order to improve the quality of an image.

Convolution is the fundamental building block of many scientific and image processing algorithms, such as those implemented in the image processing modules 12 described above. As it pertains to computational image processing, convolution involves translating an array of values (i.e., stencil data) across an array of image pixel data, multiplying each image pixel in the array of image pixel data by a corresponding (overlapping) stencil value in the stencil data, and adding the resulting values together. Equations (1) and (2) provide the definition of a standard discrete 1-dimensional and 2-dimensional convolution, respectively:

$$(Img * f)[n] \stackrel{def}{=} \sum_{k=-\infty}^{\infty} Img[k] \cdot f[n-k] \quad (1)$$

$$(Img * f)[n, m] \stackrel{def}{=} \sum_{l=-\infty}^{\infty} \sum_{k=-\infty}^{\infty} Img[k] \cdot f[n-k, m-l] \quad (2)$$

where n and m are the coordinates for an image pixel in the image pixel data, k and l are coordinate offsets, Img[ ] is the image pixel data, and f is the stencil data. Various computational image processing techniques can be implemented via convolution simply by changing the stencil data. Further, additional computational image processing techniques may be implemented by slightly modifying the standard 1-dimensional and 2-dimensional convolution processes described above.

In the course of designing an improved image processor, the inventors discovered that a large number of computational image processing techniques could be accomplished via a generalization of the standard convolution processes discussed above. Specifically, the inventors discovered that by generalizing the standard convolution processes into a more flexible "map" operation and "reduce" operation, a vast number of computational image processing techniques could be performed in a relatively similar fashion. The resulting generalization is herein referred to as a "convolution engine," and is shown by Equation (3):

$$(Img \stackrel{CE}{*} f)[n, m] \stackrel{\triangle}{=} R_{|l|<c}\{R_{|k|<c}\{\text{Map}(Img[k], f[n-k, m-l])\}\} \quad (3)$$

where m and n are the coordinates for an image pixel in the image pixel data, k and l are coordinate offsets, Img[ ] is the image pixel data, f is the stencil data, Map( ) is the map operation, R{ } is the reduce operation, and c is the size of the convolution. In general, the map operation matches each one of a subset of image pixels in the image pixel data with a corresponding stencil value from the stencil data. Further, the map operation performs one or more operations on the paired image pixel and corresponding stencil value. In other words, the map operation matches each image pixel in a subset of the image pixel data with a corresponding (overlapping) stencil value in the stencil data for each permitted location of the stencil data as it is moved over the image pixel data, and performs one or more operations on the matched image pixel and stencil value. The reduce operation combines one or more of the resulting values from the operation performed on each paired image pixel and corresponding stencil value.

By altering the operation performed on each one of the paired image pixels and corresponding stencil values by the map operation, a much larger number of computational image processing techniques may be performed using the convolution engine described in Equation (3) than can be performed by standard convolution processes. Further, by altering how the resulting values from the operation performed on each paired image pixel and corresponding stencil value are combined by the reduce operation, additional computational image processing techniques may be realized. In one embodiment, the reduce operation is a non-commutative function further including a permutation operation to align the resultant values as desired. By implementing a non-commutative function in the reduce operation, the number of computational image processing techniques capable of realization via the convolution engine is even further increased.

In one embodiment, the convolution engine is configured to perform motion estimation. Motion estimation is a key component of many video codecs including the widely used H.264. For codecs implemented in software, motion estimation may account for ~90% of execution time. Generally, a stencil operates on sub-blocks of a video frame, trying to find each sub-block's location in a previous and/or future reference frame of the video stream. In particular, H.264 employs a two-stage motion estimation process including integer motion estimation (IME) and fractional motion estimation (FME). For IME, the closest match of a sub-block of a video frame is searched for with respect to a reference image. A vector is then computed to represent the observed motion. The search is performed at each location within a two-dimensional search window, using sum of absolute differences (SAD) as the cost function. IME operates on multiple scales with various block sizes ranging from 4×4 to 16×16, though all of the larger block results can be derived from the 4×4 SAD results. SAD operations, and thus IME, fit naturally into the convolution engine: the map operation is an absolute difference operation and the reduce operation is a summation. FME refines the initial match obtained at the IME step to a quarter-pixel resolution. FME first up-samples the block selected by IME, and then performs a slightly modified variant of the aforementioned SAD. Up-sampling also fits nicely into the convolution engine and includes two convolution operations: first the image block is up-sampled using a standard convolution process with a stencil including six stencil values, and the resulting image is up-sampled by another factor of two by interpolating adjacent pixels, which can be accomplished by an additional map operation (to generate new pixels) with no reduce operation.

In one embodiment, the convolution engine is configured to perform a scale invariant feature transform (SIFT). SIFT looks for distinctive features in an image. Typical applications of SIFT use these features to find correspondence between images or video frames, performing object detection in scenes, etc. To ensure scale invariance, Gaussian blurring and down-sampling is performed on the image to create a pyramid of images at coarser and coarser scales. A Difference-of-Gaussian (DoG) pyramid is then created by computing the difference between every two adjacent image scales. Features of interest are then found by looking at the scale-space extrema in the DoG pyramid. Even though finding the scale-space extrema is a 3-dimensional stencil computation, the problem can be converted into a 2-dimensional stencil operation by interleaving rows from different images into a single buffer. The extrema operation is mapped to convolution using compare as the map operation and a logical AND as the reduce operation.

In one embodiment, the convolution engine is configured to perform a demosaic operation. Camera sensor output is typically a red, green, and blue (RGB) color mosaic laid out in a Bayer pattern. At each location, the two missing color values are then interpolated using the luminance and color values in surrounding cells. Because the color information is undersampled, the interpolation is tricky; any linear approach yields color fringes. A demosaic operation based on adaptive color plane interpretation (ACPI) may be implemented by the convolution image processor, which computes image gradients and then uses a stencil with three stencil values in the direction of the smallest gradient. While this fits the convolution engine, it requires a complex reduction operation to implement, since individual color values from the mosaic must be separated before performing interpolation.

Table 1 summarizes the various operations that may be mapped to the convolution engine and their corresponding map and reduce operations. Further, Table 1 shows the data flow pattern of the various operations (e.g., 1-dimensional convolution, 2-dimensional convolution, etc.) and the stencil sizes used. Although two operations could have identical map and reduce operations and data flow patterns, they may have differences in the way they handle data. For example, up-sampling in FME produces four times the data of its input image while demosaic, also an interpolation algorithm, needs to separate out the different color channels from a single channel two-dimensional image before operation on the data. These requirements differentiate the operations and require additional support in hardware, as discussed in detail below.

TABLE 1

Image operations mapped to the convolution engine

| Image operation | Map operation | Reduce operation | Stencil sizes | Data flow |
|---|---|---|---|---|
| IME SAD | Absolute difference | Add | 4 × 4 | 2-dimensional convolution |
| FME ½pixel up-sampling | Multiply | Add | 6 | 1-dimensional horizontal and vertical convolution |

TABLE 1-continued

Image operations mapped to the convolution engine

| Image operation | Map operation | Reduce operation | Stencil sizes | Data flow |
|---|---|---|---|---|
| FME ¼pixel up-sampling | Average | None | — | 2-dimensional matrix operation |
| SIFT Gaussian blur | Multiply | Add | 9, 13, 15 | 1-dimensional horizontal and vertical convolution |
| SIFT DoG | Subtract | None | — | 2-dimensional matrix operation |
| SIFT extrema | Compare | Logical AND | 3 | 1-dimensional horizontal and vertical convolution |
| Demosaic interpolation | Multiply | Complex | 3 | 1-dimensional horizontal and vertical convolution |

Figure 2:
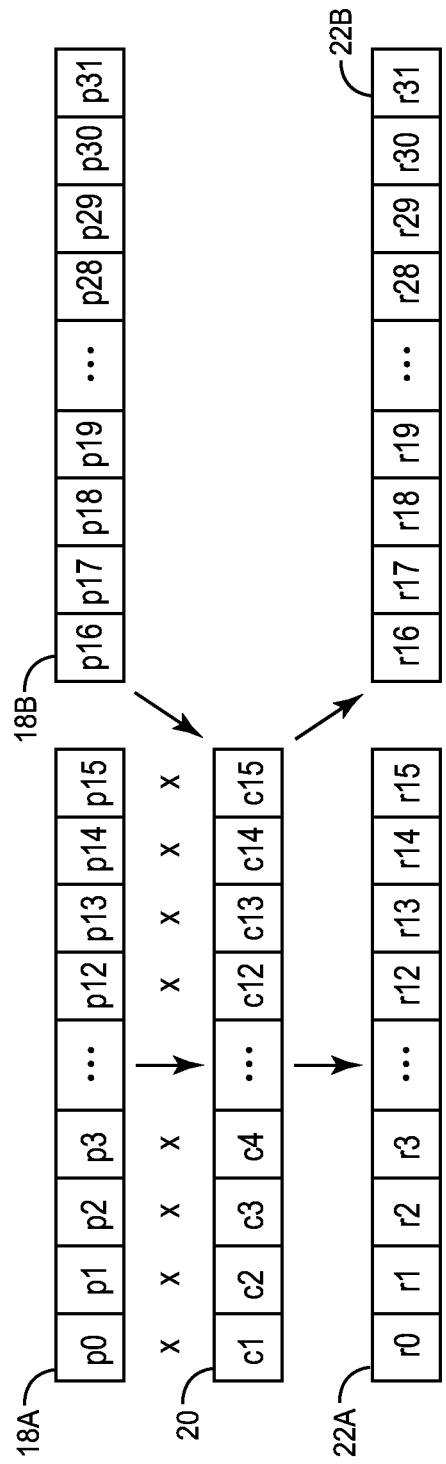
FIG. 2 is a diagram representing a computational image processing technique performed on a general-purpose parallel processor.

FIG. 2 shows a convolution data flow and accompanying pseudo-code for a standard single input multiple data (SIMD) 128-bit general-purpose processor. As shown in FIG. 2, two 128-bit input registers 18A and 18B store image pixel data, a 128-bit stencil data register 20 stores stencil data, and two 128-bit output accumulators 22A and 22B store the resultant output data. In operation, each one of the image pixels in the image pixel data is multiplied by a corresponding stencil value in the stencil data, and the result is stored to the output accumulators 22. Because the SIMD processor is a parallel processor, up to sixteen eight-bit image pixels may be operated on concurrently. However, the accompanying pseudo-code demonstrates the shortcomings of using even a SIMD general-purpose processor for performing the convolution process.

Given the short integer computation that is required for each image pixel and corresponding stencil value, a large amount of parallelism per instruction is required in order to be energy efficient. While the SIMD general-purpose processor includes the desired parallelism, the datapath of the SIMD processor is not suited for the convolution operation due to, for example, data alignment requirements. That is, the convolution process requires multiple shifted subsets of image pixel data, such that a majority of memory accesses in the convolution process are unaligned. Accordingly, a large number of memory fetch and/or data shuffle operations are required to convolve a set of sixteen image pixels. Further, the register file size of the SIMD general-purpose processor must be increased astronomically in order to accommodate the concurrent storage of multiple shifted subsets of the image pixel data. For example, scaling the datapath shown in FIG. 2 by eight times to perform four 16-bit operations per cycle would require an eight times increase in the register file size, inflating it to 1024 bits. As the register file size increases, so does the energy consumption thereof. The aforementioned overheads become even more intensive in the case of a two-dimensional convolution process.

Because graphics processing units (GPUs) are designed for massively parallel data applications, they can often achieve superior performance over SIMD processors for convolution processes. However, such an increase in performance comes at the price of increased energy consumption due to large register file structures and 32-bit floating-point arithmetic units of GPUs. Accordingly, GPUs are similarly ill suited to perform convolution processes.

Figure 3:
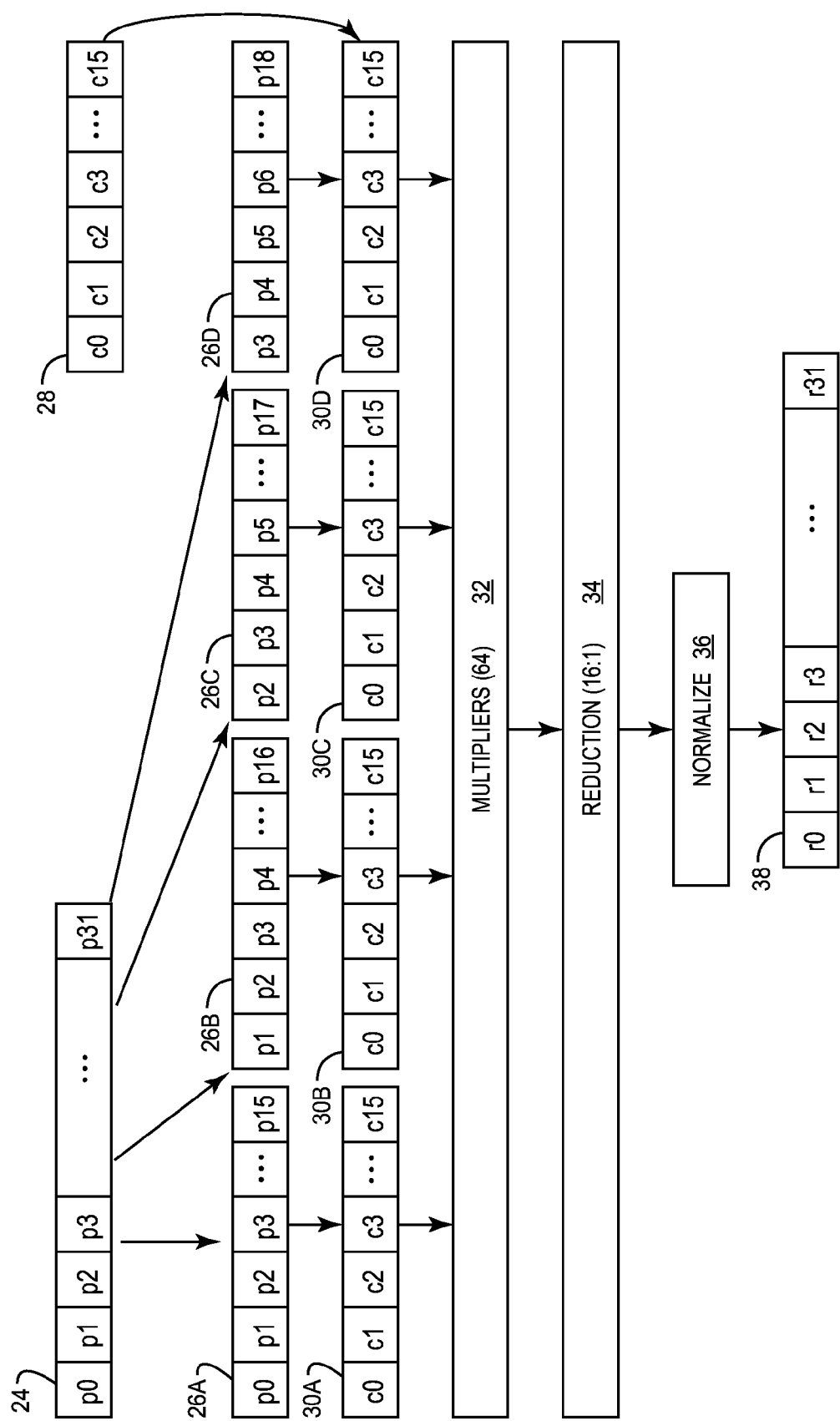
FIG. 3 is a diagram representing a computational image processing technique according to one embodiment of the present disclosure.

FIG. 3 shows a convolution data flow for a convolution image processor according to one embodiment of the present disclosure. As shown in FIG. 3, a 256-bit input shift register 24 stores image pixel data in the form of thirty-two eight-bit image pixels. Shifted subsets of the image pixel data are concurrently broadcast to a number of input broadcast registers 26A through 26D. Further, stencil data from a 128-bit stencil register 28 is replicated and fed to a number of broadcast coefficient registers 30A through 30D. The resulting sixty-four eight-bit image pixels and corresponding stencil values are concurrently fed to sixty-four multipliers 32, where they are multiplied together and delivered to a reduction stage 34. The reduction stage 34 performs a 16:1 reduction operation, combining each of the resulting values from each subset of image pixel data from one of the broadcast coefficient registers 30 and corresponding stencil data into a single value. The reduced values are delivered to a normalization stage 36 where they are normalized and placed into a 256-bit output register 38. As is evident from the above, the data flow shown in FIG. 3 is far superior to that shown in FIG. 2. Specifically, the data flow shown in FIG. 3 can fill all sixty-four multipliers 32 with relevant data from a single 256-bit input shift register. Accordingly, value register file area and access energy can be saved.

Figure 4:
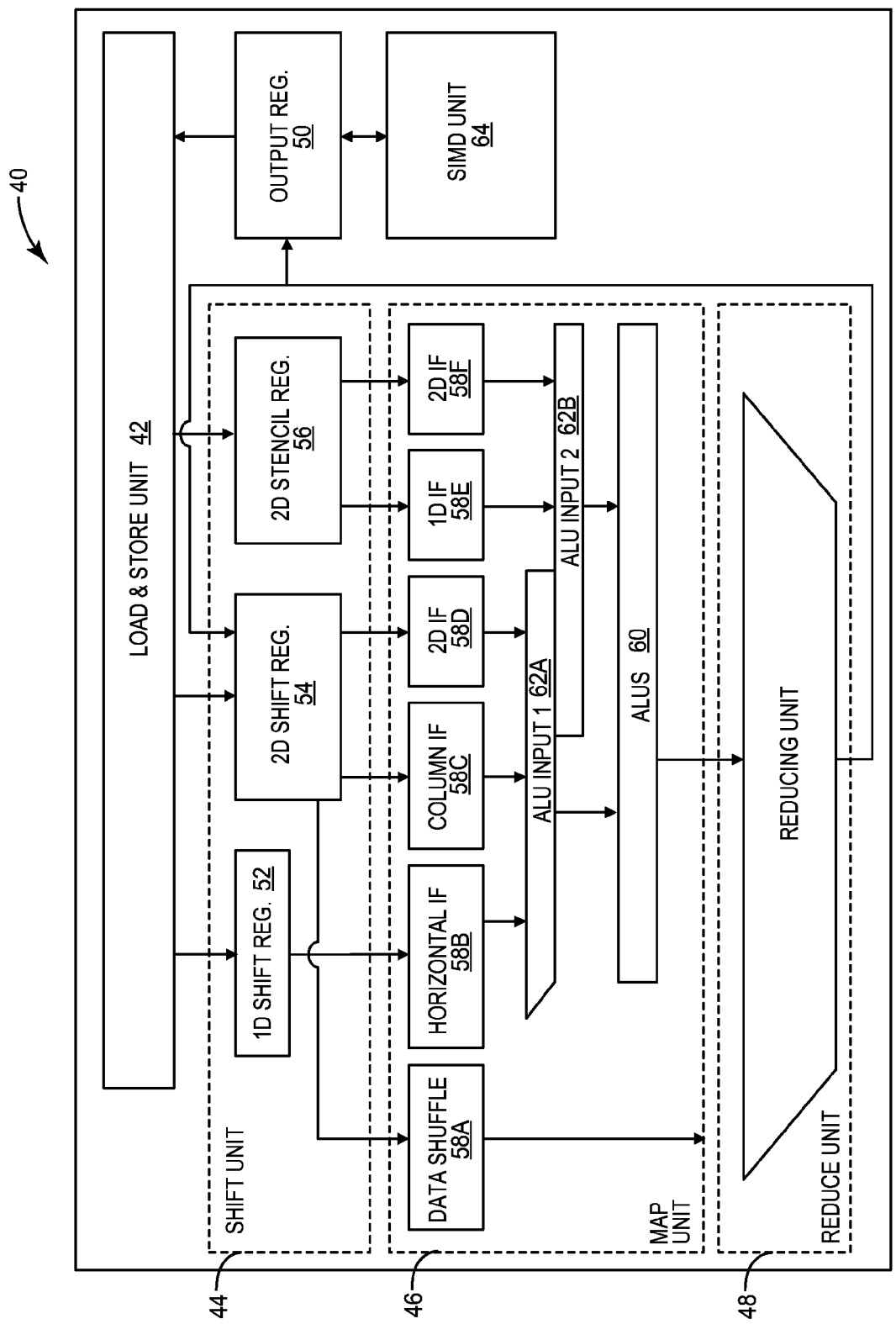
FIG. 4 is a block diagram representing a convolution image processor according to one embodiment of the present disclosure.

FIG. 4 shows details of a convolution image processor 40 discussed above according to one embodiment of the present disclosure. The convolution image processor 40 includes a load and store unit 42, a shift register unit 44, a mapping unit 46, a reduction unit 48, and an output register 50. The load and store unit 42 loads and stores image pixel data and stencil data to and from various register files. To improve efficiency, the load and store unit 42 supports multiple memory access widths and can handle unaligned accesses. In one embodiment, the maximum memory access width of the load and store unit 42 is 256-bits. Further, in another embodiment, the load and store unit 42 provides interleaved access where data from a memory load is split and stored in two registers. This may be helpful in applications such as demosaic, which requires splitting the input data into multiple color channels. By designing the load and store unit 42 to support multiple memory access widths and unaligned accesses, the flexibility of the data flow in the convolution image processor 40 is vastly improved. That is, any of the data in the load and store unit 42 may be accessed via a single read operation, which saves both time and power.

The shift register unit 44 includes a number of 1-dimensional and 2-dimensional shift registers. Specifically, the shift register unit 44 includes a first 1-dimensional shift register 52, a 2-dimensional shift register 54, and a 2-dimensional stencil register 56. In general, the first 1-dimensional shift register 52, the 2-dimensional shift register 54, and the 2-dimensional stencil register 56 provide a subset of image pixel data from the load and store unit 42 to the mapping unit 46, allowing new image pixel data to be shifted in as needed. The first 1-dimensional shift register 52 may be used by the convolution image processor 40 for a horizontal convolution process, in which new image pixels are shifted horizontally into the 1-dimensional shift register 52 as a 1-dimensional stencil moves over an image row. The 2-dimensional shift register 54 and the 2-dimensional stencil register 56 may be used for vertical and 2-dimensional convolution processes. Specifically, the 2-dimensional shift register 54 may be used to store image pixel data, while the 2-dimensional stencil register 56 may be used to store stencil data. The 2-dimensional shift register 54 supports vertical row shift: one new row of image pixel data is shifted into the 2-dimensional shift register 54 as a 2-dimensional stencil moves vertically down into the image. The 2-dimensional shift register 54 further provides simultaneous access to all of the image pixels stored therein, thereby enabling the shift register unit 44 to simultaneously feed any number of desired image pixels to the mapping unit 46. A standard vector register file, due to its limited design, is incapable of providing the aforementioned functionality.

The 2-dimensional stencil register 56 stores data that does not change as the stencil moves across the image. Specifically, the 2-dimensional stencil register 56 may store stencil data, current image pixels, or pixels at the center of windowed min/max stencils. The results of filtering operations from the mapping unit 46 and the reduction unit 48 are written back either to the 2-dimensional shift register 54 or to the output register 50. The output register 52 is designed to behave both as a 2-dimensional shift register as well as a vector register file. The shift register behavior of the output register 50 is invoked when the data from the reduction unit 48 is written to the output register 50. The shift register functionality of the output register 50 simplifies register write logic and reduces energy, which is especially useful when the stencil operation produces the data for just a few locations and the newly produced data needs to be merged with existing data which would normally result in a read modify and write operation. Specifically, by shifting the write location of the output register 50 to the next empty element upon each write operation from the reduction unit 48, time and energy may be saved in the convolution image processor 40. The vector register file behavior of the output register 50 is invoked when the output register file is interfaced with a vector unit of some kind.

Using the 2-dimensional shift register 54 and the 2-dimensional stencil register 56 in the shift register unit 44 makes the convolution image processor 40 tailored to the storage and access of image pixel data. Specifically, because image pixel data includes both rows and columns of image pixel values, storing and accessing the image pixel data as in a 2-dimensional register leads to significant advantages in the efficiency and performance of the convolution image processor when storing or accessing the data. As discussed above, data overheads such as predicting, fetching, storing, and accessing data in memory account for a large portion of the processing time in general purpose processors. Accordingly, the convolution image processor 40 is far more efficient and performs better than such general purpose processors.

The mapping unit 46 includes a number of interface units (IFs) 58A-58F and a number of arithmetic logic units (ALUs) 60. The IFs 58 arrange image pixel data provided by one of the shift registers in the shift register unit 44 into a specific pattern to be acted upon by the ALUs 60. Arranging the data may include providing multiple shifted 1-dimensional or 2-dimensional blocks of image pixel data, providing access to multiple shifted vertical columns of image pixel data, or providing multiple arbitrary arrangements of image pixel data. All of the functionality required for generating multiple shifted versions of the image pixel data is encapsulated in the IFs 58. This allows a shortening of wires by efficiently generating the image pixel data required by the ALUs 60 within one block while keeping the rest of the datapath of the convolution image processor 40 simple and relatively free of control logic. Since the IFs 58 are tasked to facilitate stencil based operations, multiplexing logic for the IFs 58 remains simple and prevents the IFs 58 from becoming a bottleneck.

The IFs 58 may include a number of task-specific IFs 58 configured to arrange image pixel data in a particular way. Specifically, the IFs 58 may include a data shuffle IF 58A, a horizontal IF 58B, a column IF 58C, a first 2-dimensional IF 58D, a 1-dimensional IF 58E, and a second 2-dimensional IF 58F. The data shuffle IF 58A may be coupled to the 2-dimensional shift register 54 and configured to provide one or more arbitrary arrangements of image pixel data from the 2-dimensional shift register 54 to the reduction unit 48. The horizontal IF 58B may be coupled to the 1-dimensional shift register 52 and configured to provide multiple shifted versions of a row of image pixel data from the 1-dimensional shift register 52 to a first input 62A of the ALUs 60. The column IF 58C may be coupled to the 2-dimensional shift register 54 and configured to provide multiple shifted versions of a column of image pixel data from the 2-dimensional shift register 54 to the first input 62A of the ALUs 60. The first 2-dimensional IF 58D may be coupled to the 2-dimensional shift register 54 and configured to provide multiple shifted versions of a 2-dimensional block of image pixel data from the 2-dimensional shift register 54 to the first input 62A of the ALUs 60. The 1-dimensional IF 58E may be coupled to the 2-dimensional stencil register 56 and configured to provide multiple shifted versions of a 1-dimensional block of stencil data (either row or column) from the 2-dimensional stencil register 56 to a second input 62B of the ALUs 60. The second 2-dimensional IF 58 F may be coupled to the 2-dimensional stencil register 56 and configured to provide multiple shifted versions of a 2-dimensional block of stencil data from the 2-dimensional stencil register 56 to the second input 62B of the ALUs 60. Multiple data sizes are supported by each one of the IFs 58 and an appropriate one may be selected.

Since all of the data re-arrangement is handled by the IFs 58, the ALUs 60 are simply fixed point two-input arithmetic ALUs. The ALUs 60 may be configured to perform arithmetic operations such as multiplication, difference of absolutes, addition, subtraction, comparison, and the like on a given image pixel and stencil value. The mapping unit 46 may be programmable, such that the particular arrangement of image pixel data provided to each one of the ALUs 60 by the IFs 58 and the operation performed by each one of the ALUs 60 can be selected, for example, by a user. Providing such flexibility in the mapping unit 46 allows the convolution image processor 40 to implement a large number of convolution operations such that the convolution image processor can perform a variety of image processing techniques. The versatility of the mapping unit 46, when combined with the efficiency of the shift register unit 44, results in a convolution image processor 40 that is highly efficient due to data write and access patterns in both the shift register unit 44 and the mapping unit 46 that are tailored to image pixel data and highly versatile due to the programmability of the mapping unit 46.

The output of each one of the ALUs 60 is fed to the reduction unit 48. In general, the reduction unit 48 is configured to combine at least two of the resulting values from the mapping unit 46. The number of resulting values from the mapping unit 46 combined by the reduction unit 48 is dependent upon the size of the stencil used in the convolution process. For example, a 4×4 2-dimensional stencil requires a 16 to 1 reduction, while a 2×2 2-dimensional stencil requires an 8 to 1 reduction. The reduction unit 48 may be implemented as a tree and outputs can be tapped out from multiple stages of the tree. In one embodiment, complex reductions may be performed by the reduction unit 48 in order to increase the functionality of the convolution image processor 40, as discussed in further detail below.

As an example of the operation of the convolution image processor 40, a convolution process using 4×4 2-dimensional stencil data is now described. Stencil data from the load and store unit 42 is loaded into the first four rows of the 2-dimensional stencil register 56. Further, four rows of image pixel data are shifted into the first four rows of the 2-dimensional shift register 54. In the present example, there are 64 ALUs 60 in the mapping unit 46. Accordingly, up to four 4×4 2-dimensional blocks may be operated on in parallel. The first 2-dimensional IF 58D thus generates four shifted versions of 4×4 2-dimensional blocks of image pixel data from the 2-dimensional shift register 54 and feeds them to the first input 62A of the ALUs 60. The second 2-dimensional IF 58F copies the 4×4 2-dimensional stencil four times and sends each stencil value to the second input 62B of the ALUs 60. Each one of the 64 ALUs 60 then performs an element-wise arithmetic operation (e.g., multiplication) on a different image pixel and corresponding stencil value. The 64 resulting values are then delivered to the reduction unit 48, where they are combined with the other resulting values from the 4×4 block in which they originated for a 16 to 1 reduction, for example, by summing the resulting values for each 4×4 block. The four outputs of the reduction unit 48 are then normalized and written to the output register 50.

Since the registers contain data for sixteen filter locations, the same operation described above is continued, however, the first 2-dimensional IF 58D employs horizontal offset to skip over locations that have already been processed and get new data while the rest of the operations described above continue to execute. Once sixteen locations have been filtered, the existing rows are shifted down and a new row of image pixel data is brought into the 2-dimensional shift register 54 from the load and store unit 42. The data processing then continues in the vertical direction. Once all rows have been operated on, the process is started again from the first image row, processing the next vertical stripe and continuing execution until the whole input data has been filtered.

For symmetric stencils, the IFs 58 combine the symmetric data before coefficient multiplication (since the stencil values are the same). Accordingly, the ALUs 60 may be implemented as adders instead of multipliers. Since adders take 2-3× less energy than multipliers, the energy consumption of the convolution image processor 40 may be further reduced.

In one embodiment, an additional SIMD unit 64 may be provided in the convolution image processor 40 to enable an algorithm to perform vector operations on the output data located in the output register 50. The SIMD unit 64 may interface with the output register 50 to perform regular vector operations. The SIMD unit 64 may be a lightweight unit which only supports basic vector add and subtract type operations and has no support for higher cost operations such as multiplications found in a typical SIMD engine. An application may perform computation that conforms neither to the convolution block nor to the vector unit, or may otherwise benefit from a fixed function implementation. If the designer wishes to build a customized unit for such computation, the convolution image processor allows the fixed function block to access its output register 50. In one exemplary embodiment, additional custom functional blocks such as those used to compute motion vector costs in IME, FME, and Hadamard Transform in FME are implemented in additional SIMD units 64.

In one embodiment, the convolution image processor 40 is implemented as a processor extension, adding a small set of convolution engine instructions to the processor instruction set architecture (ISA). The additional convolution engine instructions can be issued as needed in software through compiler intrinsics. Table 2 lists a number of exemplary instructions and their functions that may be used with the convolution image processor 40 according to various embodiments.

TABLE 2

Exemplary convolution engine instructions and functions

| Instruction | Function |
| --- | --- |
| SET_CE_OPS | Set arithmetic functions for MAP and REDUCE operations |
| SET_CE_OPSIZE | Set convolution size |
| LD_COEFF_REG_n | Load n bits to specified row of 2-dimensional coefficient register |
| LD_1D_REG_n | Load n bits to 1-dimensional shift register; optional shift left |
| LD_2D_REG_n | Load n bits to top row of 2-dimensional shift register; option shift row down |
| STD_OUT_REG_n | Store top row of 2D output register to memory |
| CONVOLVE_1D_HOR | 1-dimensional convolution step - input from 1-dimensional shift register |
| CONVOLVE_1D_VER | 1-dimensional convolution step - column access to 2-dimensional shift register |
| CONVOLVE_2D | 2-dimensional convolution step with 2-dimensional access to 2-dimensional shift register |

FIG. 5 shows exemplary pseudocode that may be used to implement a horizontal convolution with 15 stencil values for a single image row. Generally, there are three types of instructions added to the ISA. First, configuration instructions set options that are expected to stay fixed for a stencil such as convolution size, ALU operation to use, etc. Other options that can change on a per instruction basis are specified as instruction operands. Next, there are load and store operations to store data into appropriate registers as required. Specifically, there is a load instruction for each input register type (e.g., the 1-dimensional shift register, 2-dimensional shift register, and coefficient registers). Finally, there are compute instructions, one for each of the three supported convolution processes—1-dimensional horizontal convolution, 1-dimensional vertical convolution, and 2-dimensional convolution. In one exemplary embodiment, the CONVOLVE_2D instruction reads one set of values from the 2-dimensional shift register 54 and the 2-dimensional stencil register 56, performs a 2-dimensional convolution, and writes the result into the first row of the output register 50. The load, store, and compute instructions are issued repeatedly as needed to implement the required algorithm.

With reference to the pseudocode shown in FIG. 5, the convolution image processor 40 is first set to perform a multiplication as the map operation and a summation for the reduce operation in the first line of pseudocode. Next, the convolution size is set as 16, which controls the pattern in which data is fed from the various registers to the ALUs 60 in the mapping unit 46. Stencil values are then loaded into the 2-dimensional stencil register 56. Finally, the main processing loop repeatedly loads new image pixel values into the 1-dimensional shift register 52 and issues 1 D_CONVOLVE instructions to perform the convolution operation. While 16 new pixels are read with every load, a convolution image processor 40 with 128 ALUs 60 can only process eight stencils with 16 stencil values per operation. Accordingly, two 1 D_CONVOLVE instructions are issued per iteration, where the second operation reads the input from an offset of eight and writes its output at an offset of eight in the output register 50. For illustration purposes, a SIMD instruction that adds two to the output in the first row of the output register 50 is also shown. The results from the output register 50 are then written back to memory.

Notably, unlike a stand-alone accelerator, the sequence of operations in the convolution image processor 40 is completely controlled via software, thereby giving complete control and flexibility over the convolution algorithm implemented by the convolution image processor 40. The convolution engine instructions may be mixed with standard code, thereby lending added flexibility to the operation of the convolution image processor 40. For example, it is possible to generate and save an output from the convolution image processor 40 to memory, subsequently perform one or more non-convolution engine operations on the output, then invoke the convolution image processor 40 to produce an additional output.

Figure 6:
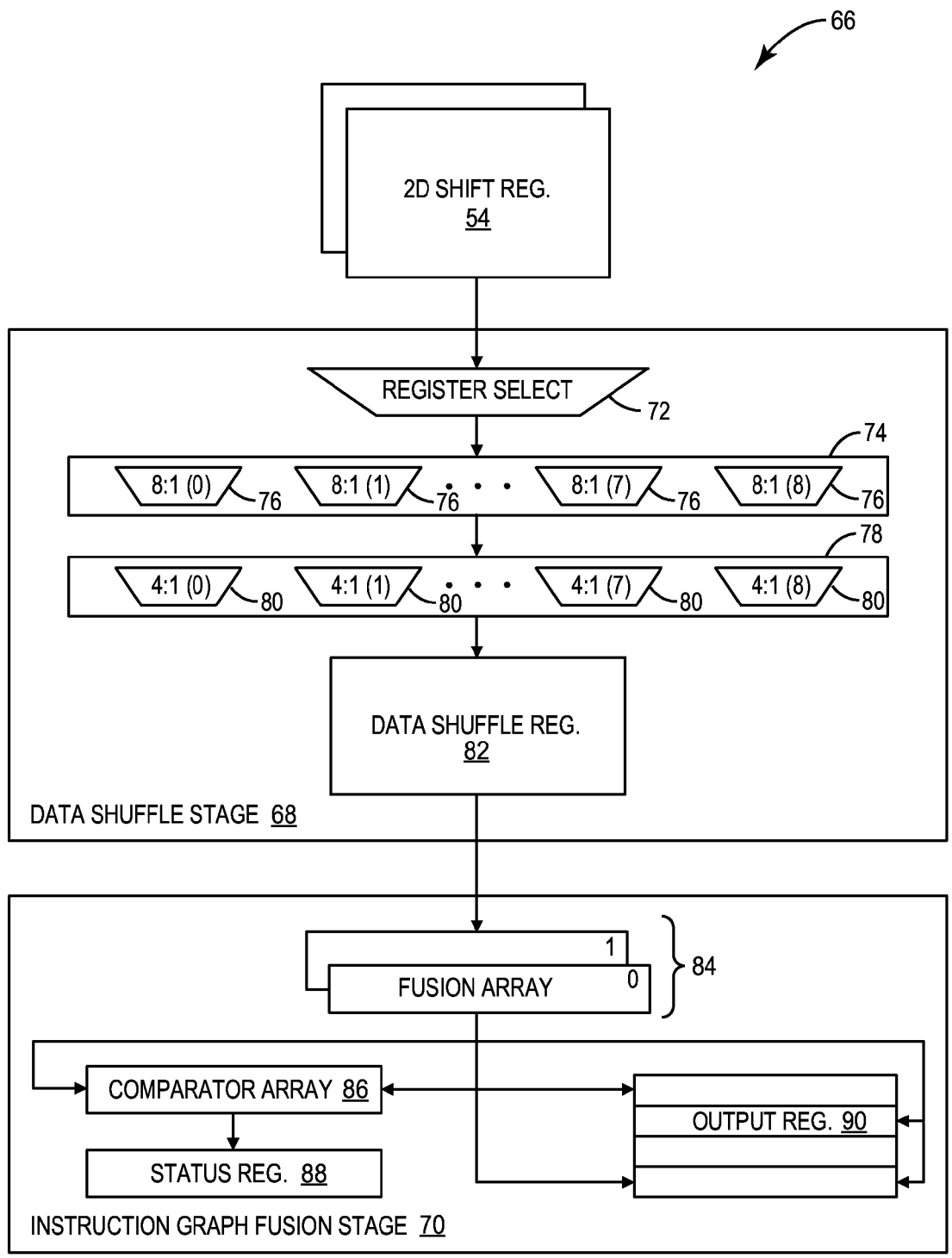
FIG. 6 is a block diagram representing a complex graph fusion stage according to one embodiment of the present disclosure.

As discussed above, it may be desirable to increase the complexity of the reduction unit 48 in some applications in order to increase the domain of applications of the convolution image processor 40. Accordingly, FIG. 6 shows a complex graph fusion unit 66, which may be used as the reduction unit 48 of the convolution image processor 40 in various embodiments. The extra complexity afforded by the complex graph fusion unit 66 allows many different convolution instructions to be merged into a single "super instruction," which in turn allows a small program to be executed for each image pixel value in one convolution instruction. For example, a demosaic operation may benefit from the execution of multiple instructions per image pixel value per convolution instruction since it needs to adjust its operation based on local gradients. While demosaic could be implemented using a standard reduction unit 48, additional hardware would first need to compute its gradients. The gradients would then need to be compared to determine which direction was more stable, and finally this information could be used by the convolution image processor 40 to compute the desired output. Since all of the aforementioned information is available from the original input data and the total computation is not complex, it may be beneficial to perform all of these operations in one step. Doing so may increase the computational efficiency proportionally to the reduction in required instructions.

The complex graph fusion unit 66 includes a data shuffle stage 68 and an instruction graph fusion stage 70. The data shuffle stage 68 includes a register selector 72, a shuffle network 74 including a number of data shift units 76, an element shift network 78 including a number of shifter units 80, and a data shuffle register 82. The data shuffle stage 68 is configured as a highly flexible swizzle network that provides shifted and permutated versions of data fed to the data shuffle network 74. The flexible swizzle network can reorder input data to support 1-dimensional horizontal, 1-dimensional vertical, and even 2-dimensional windowed fusions. Although useful, the added flexibility comes at the cost of increased energy consumption. Accordingly, the complex graph fusion unit 66 is bypassed during standard convolution instructions. Because oftentimes many convolution instructions can use the shuffled data from the data shuffle stage 68, it is separated from the instruction graph fusion stage 70. The data shuffle register 82 is used to communicate between the data shuffle stage 68 and the instruction graph fusion stage 70 in order to reduce energy wasted in register file accesses.

While the data shuffle stage 68 is tasked with data reordering, the instruction graph fusion stage 70 is responsible for executing more complex data combining to implement fused instruction subgraphs. The instruction graph fusion stage includes a number of fusion array elements 84, a comparator array 86, a status register 88, and an output register 90. The instruction graph fusion stage 70 employs the fusion array elements 84 to support a variety of arithmetic operations. Each one of the fusion array elements 84 can implement data dependent data flow by using predicated execution. These units are pipelined, so bits of the status register 88 which are set from computation from previous instructions can be used later in the computation to generate a desired output. Like a normal reduction unit, the outputs of the fusion array elements 84 are fed to the 2-dimensional output register 90, where they are stored in pairs.

Figure 7:
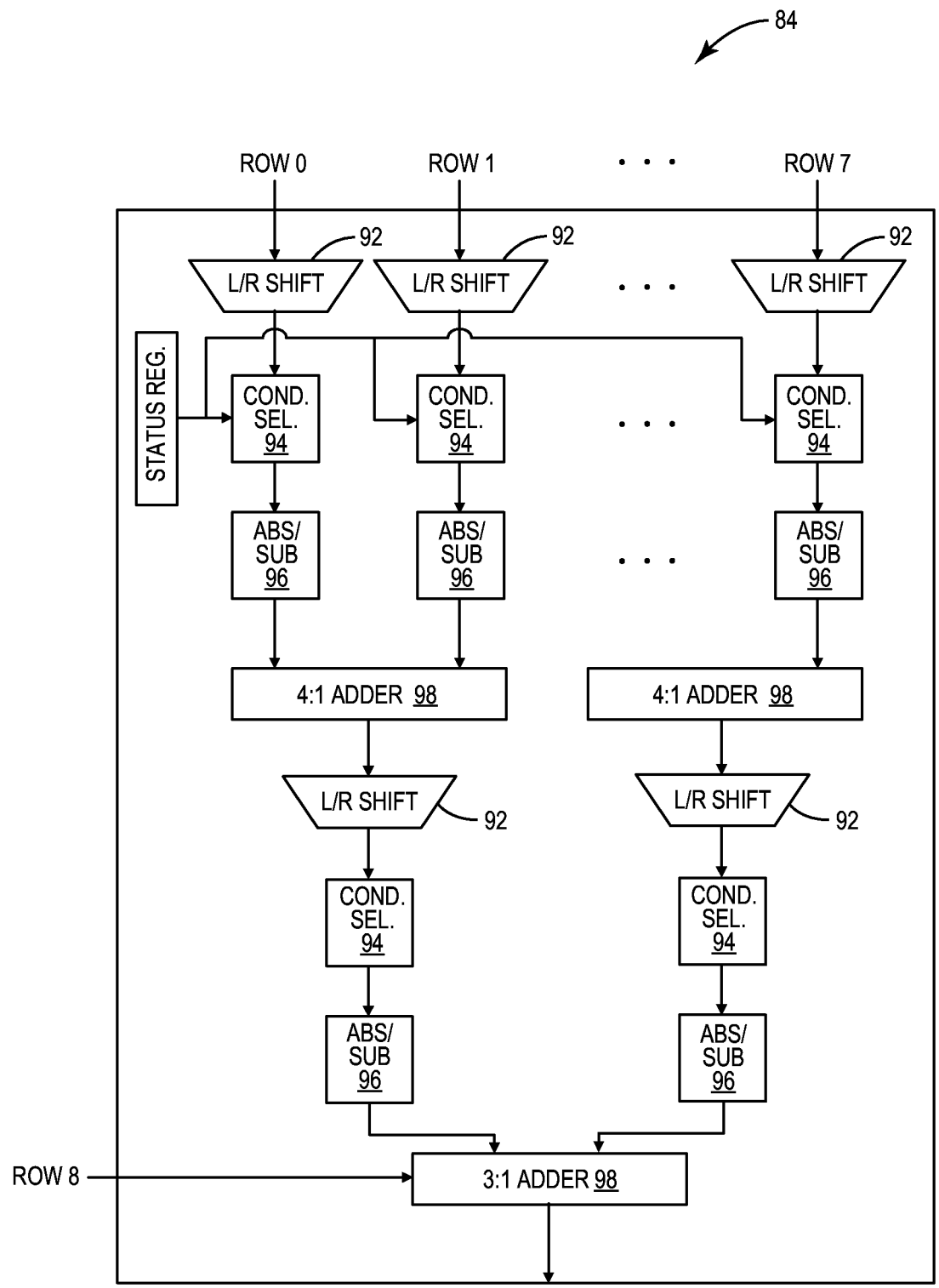
FIG. 7 is a block diagram representing details of the complex graph fusion stage according to one embodiment of the present disclosure.

FIG. 7 shows details of the fusion array elements 84 according to one embodiment of the present disclosure. Each one of the fusion array elements 84 is a tree structure including a number of data shifters 92, condition selectors 94, arithmetic units 96, and adders 98 in each stage. Each one of the fusion array elements 84 receives data from the data shuffle register 82 and fuses together up to nine arithmetic operations, thereby drastically reducing the number of instructions and thus computation time of the convolution image processor 40.

Figure 8:
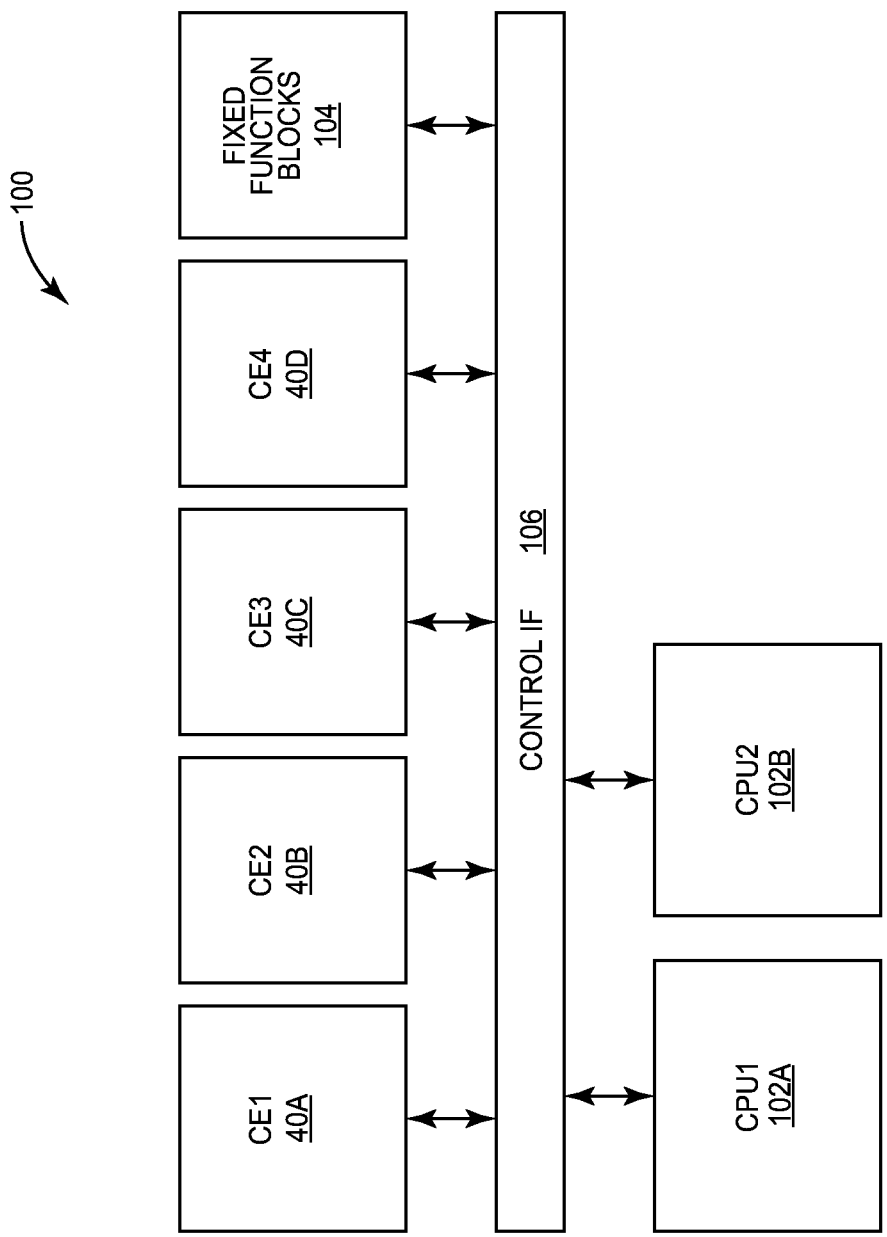
FIG. 8 is a block diagram representing an exemplary image processing architecture according to an additional embodiment of the present disclosure.

To meet the diverse performance and energy requirements of different applications effectively, a convolution chip multiprocessor (CMP), such as a CMP 100 shown in FIG. 8, may be used. The CMP 100 includes four convolution image processors 40, two extensible general-purpose processors 102, and a number of fixed function blocks 104 communicating with the convolution image processors 40 via a control interface 106. In one embodiment, the general-purpose processors 102 are Tensilica RISC processors that communicate to the convolution image processors 40 via muxed Tensilical processor extension (TIE) ports. In the CMP 100, each instance of the convolution image processor 40 is referred to as a slice, and the slices posses the capability to operate completely independent of other slices and also in concatenation to perform an even larger number of operations per cycle. Dynamic concatenation of slices is especially desirable when the performance requirements of an algorithm cannot be satisfied by one slice or when an algorithm operates on small data requiring more than 64 operations per cycle to amortize overheads. When the slices are concatenated dynamically the register files and interface units of the interconnected slices are joined through short wires that run from one slice to another. Since the slices are laid out in close proximity to one another, these wires waste very little energy. Accordingly, the energy efficiency of the connected slices is not affected.

In addition to connecting multiple slices together to form a bigger slice with wide registers and ALU arrays, it is also possible to shut off the ALUs in the additional slices and use their registers as additional independent storage structures. Although all the slices offer the same functionality, two or more of the slices may include complex graph fusion units integrated into their reduction units. The side effect of this integration is an additional 10-15% cost incurred in convolution operations executed on the slices. The processors and the slices may be fed by dual-ported 16K instruction and 32K data caches. The general purpose processors 102 may be responsible for data address generation for the connected slices, but the flow of data into and out of the data cache is controlled by the slices themselves.

Those skilled in the art will recognize improvements and modifications to the preferred embodiments of the present disclosure. All such improvements and modifications are considered within the scope of the concepts disclosed herein and the claims that follow.

What is claimed is:

1. A convolution image processor comprising:
    a load and store unit configured to load and store image pixel data and stencil data such that the load and store unit provides unaligned access to the image pixel data;
    a shift register unit configured to load and store at least a portion of the image pixel data from the load and store unit and concurrently provide access to each image pixel value in the portion of the image pixel data; and
    a mapping unit comprising:
        a plurality of interface units each configured to:
            generate a plurality of shifted versions of image pixel data from the portion of the image pixel data such that a pattern of the shifted versions of image pixel data is different between each of the plurality of interface units; and
            provide corresponding stencil data to the shifted versions of image pixel data; and
        a plurality of arithmetic logic units (ALUs) configured to concurrently perform one or more operations on each image pixel value in the plurality of shifted versions of the portion of the image pixel data and a corresponding stencil value in the corresponding stencil data provided from a subset of the plurality of interface units, wherein the subset of the plurality of interface units and the one or more operations performed on each image pixel value are programmable.

2. The convolution image processor of claim 1 wherein the shift register unit includes a number of two dimensional shift registers.

3. The convolution image processor of claim 1 further comprising a reducing unit configured to combine at least two of the resulting values from the one or more operations on each image pixel value and the corresponding stencil value in the corresponding stencil data.

4. The convolution image processor of claim 3 wherein performing the one or more operations on each image pixel value in the plurality of shifted versions of the portion of the image pixel data and the corresponding stencil value in the corresponding stencil data comprises multiplying each image pixel value in the plurality of shifted versions of the portion of the image pixel data and the corresponding stencil value in the corresponding stencil data.

5. The convolution image processor of claim 4 wherein combining at least two of the resulting values from the one or more operations on each image pixel value and the corresponding stencil value in the corresponding stencil data comprises adding the resulting values.

6. The convolution image processor of claim 3 wherein performing the one or more operations on each image pixel value in the plurality of shifted versions of the portion of the image pixel data and the corresponding stencil value in the corresponding stencil data comprises calculating the absolute difference between each image pixel value in the plurality of shifted versions of the portion of the image pixel data and the corresponding stencil value in the corresponding stencil data.

7. The convolution image processor of claim 6 wherein combining at least two of the resulting values from the one or more operations on each image pixel value and the corresponding stencil value in the corresponding stencil data comprises adding the resulting values.

8. The convolution image processor of claim 3 wherein performing the one or more operations on each image pixel value in the plurality of shifted versions of the portion of the image pixel data and the corresponding stencil value in the corresponding stencil data comprises comparing each image pixel value in the plurality of shifted versions of the portion of the image pixel data and the corresponding stencil value in the corresponding stencil data.

9. The convolution image processor of claim 8 wherein combining at least two of the resulting values from the one or more operations on each image pixel value and the corresponding stencil value in the corresponding stencil data comprises performing a logical AND on the resulting values.

10. The convolution image processor of claim 3 wherein performing the one or more operations on each image pixel value in the plurality of shifted versions of the portion of the image pixel data and the corresponding stencil value in the corresponding stencil data comprises subtracting the corresponding stencil value in the corresponding stencil data from each image pixel value in the plurality of shifted versions of the portion of the image pixel data.

11. The convolution image processor of claim 1 wherein the plurality of shifted versions of the portion of the image pixel data are one or more of a horizontally shifted version and a vertically shifted version.

12. The convolution image processor of claim 1 wherein performing the one or more operations on each image pixel value in the plurality of shifted versions of the portion of the image pixel data and the corresponding stencil value in the corresponding stencil data comprises one of:
  multiplying each image pixel value in the plurality of shifted versions of the portion of the image pixel data and the corresponding stencil value in the corresponding stencil data;
  comparing each image pixel value in the plurality of shifted versions of the portion of the image pixel data and the corresponding stencil value in the corresponding stencil data;
  averaging each image pixel value in the plurality of shifted versions of the portion of the image pixel data and the corresponding stencil value in the corresponding stencil data; and
  subtracting the corresponding stencil value in the corresponding stencil data from each image pixel value in the plurality of shifted versions of the portion of the image pixel data.

13. The convolution image processor of claim 1 wherein the stencil data is image pixel data from a reference image.

14. A method of operating a convolution image processor comprising:
  loading and storing image pixel data and stencil data and providing unaligned access of the image pixel data via a load and store unit;
  loading and storing at least a portion of the image pixel data and concurrently providing access to each image pixel value in the portion of image pixel data via a shift register unit;
  generating a plurality of shifted versions of image pixel data and corresponding stencil data from the portion of the image pixel data via a plurality of interface units such that a pattern of the shifted versions of image pixel data is different between each of the plurality of interface units; and
  concurrently performing one or more operations on each image pixel value in the plurality of shifted versions of the portion of the image pixel data and a corresponding stencil value in the corresponding stencil data provided from a subset of the plurality of interface units via a mapping unit, wherein the subset of the plurality of interface units and the one or more operations performed on each image pixel value are programmable.

15. The method of claim 14 further comprising combining at least two of the resulting values from the one or more operations on each image pixel value and the corresponding stencil value in the corresponding stencil data via a reducing unit.

16. The method of claim 15 wherein performing the one or more operations on each image pixel value in the plurality of shifted versions of the portion of the image pixel data and the corresponding stencil value in the corresponding stencil data comprises multiplying each image pixel value in the plurality of shifted versions of the portion of the image pixel data and the corresponding stencil value in the corresponding stencil data.

17. The method of claim 16 wherein combining at least two of the resulting values from the one or more operations on each image pixel value and the corresponding stencil value in the corresponding stencil data comprises adding the resulting values.

18. The method of claim 15 wherein performing the one or more operations on each image pixel value in the plurality of shifted versions of the portion of the image pixel data and the corresponding stencil value in the corresponding stencil data comprises calculating the absolute difference between each image pixel value in the plurality of shifted versions of the portion of the image pixel data and the corresponding stencil value in the corresponding stencil data.

19. The method of claim 18 wherein combining at least two of the resulting values from the one or more operations on each image pixel value and the corresponding stencil value in the corresponding stencil data comprises adding the resulting values.

20. The method of claim 15 wherein performing the one or more operations on each image pixel value in the plurality of shifted versions of the portion of the image pixel data and the corresponding stencil value in the corresponding stencil data comprises comparing each image pixel value in the plurality of shifted versions of the portion of the image pixel data and the corresponding stencil value in the corresponding stencil data.

21. The method of claim 20 wherein combining at least two of the resulting values from the one or more operations on each image pixel value and the corresponding stencil value in the corresponding stencil data comprises performing a logical AND on the resulting values.

22. The method of claim 15 wherein performing the one or more operations on each image pixel value in the plurality of shifted versions of the portion of the image pixel data and the corresponding stencil value in the corresponding stencil data comprises subtracting the corresponding stencil value in the corresponding stencil data from each image pixel value in the plurality of shifted versions of the portion of the image pixel data.

23. The method of claim 14 wherein the plurality of shifted versions of the portion of the image pixel data are one or more of a horizontally shifted version and a vertically shifted version.

24. The method of claim 14 wherein performing the one or more operations on each image pixel value in the plurality of shifted versions of the portion of the image pixel data and the corresponding stencil value in the corresponding stencil data comprises one of:
  multiplying each image pixel value in the plurality of shifted versions of the portion of the image pixel data and the corresponding stencil value in the corresponding stencil data;

comparing each image pixel value in the plurality of shifted versions of the portion of the image pixel data and the corresponding stencil value in the corresponding stencil data;

averaging each image pixel value in the plurality of shifted versions of the portion of the image pixel data and the corresponding stencil value in the corresponding stencil data; and subtracting the corresponding stencil value in the corresponding stencil data from each image pixel value in the plurality of shifted versions of the portion of the image pixel data.

25. The method of claim 14 wherein the stencil data is image pixel data from a reference image.

\* \* \* \* \*

UNITED STATES PATENT AND TRADEMARK OFFICE
CERTIFICATE OF CORRECTION

PATENT NO. : 9,477,999 B2
APPLICATION NO. : 14/492535
DATED : October 25, 2016
INVENTOR(S) : Rehan Hameed et al.

It is certified that error appears in the above-identified patent and that said Letters Patent is hereby corrected as shown below:

In the Specification:

In column 5, line 50, replace the roman variables "n" and "m" with variables --$n$-- and --$m$--, respectively.

In column 5, line 51, replace the roman variables "k" and "l" with variables --$k$-- and --$l$--, respectively.

In column 5, line 51, replace "1mg[ ]" with --$Img$[ ]--.

In column 5, line 52, replace the roman variable "f" with variable --$f$--.

In column 6, equation 3, replace

" $\left(Img \stackrel{CE}{*} f\right)[n,m] \stackrel{def}{=} R_{|l|<c}\left\{R_{|k|<c}\{Map(Img[k], f[n-k, m-l])\}\right\}$ " with -- $\left(Img \stackrel{CE}{*} f\right)[n,m] \stackrel{def}{=} R_{|l|<c}\left\{R_{|k|<c}\{Map(Img[k], f[n-k, m-l])\}\right\}$ --.

In column 6, line 6, replace the roman variables "m" and "n" with variables --$m$-- and --$n$--, respectively.

In column 6, line 7, replace the roman variables "k" and "l" with variables --$k$-- and --$l$--, respectively.

In column 6, line 7, replace "1mg[ ]" with --$Img$[ ]--.

In column 6, line 8, replace the roman variable "f" with variable --$f$--.

In column 6, line 9, replace the roman variables "R" and "c" with variables --$R$-- and --$c$--.

Signed and Sealed this
Twentieth Day of December, 2016

Michelle K. Lee
*Director of the United States Patent and Trademark Office*

CERTIFICATE OF CORRECTION (continued)
U.S. Pat. No. 9,477,999 B2

In the Specification:

In column 7, line 64, in Table 1, replace "FME ½pixel" with --FME ½ pixel--.

In column 8, line 7, in Table 1, replace "FME ¼pixel" with --FME ¼ pixel--.

In column 11, line 22, replace "IF 58 F" with --IF 58F--.

In column 13, lines 58-59, replace "1 D_CONVOLVE" with --1D_CONVOLVE--.

In column 13, line 63, replace "1 D_CONVOLVE" with --1D_CONVOLVE--.